United States Patent [19]

Blumhardt

[11] Patent Number: 5,420,914
[45] Date of Patent: May 30, 1995

[54] SYSTEM AND METHOD FOR REAL TIME CARRIER SELECTION

[75] Inventor: Mark S. Blumhardt, Niwot, Colo.

[73] Assignee: U S West Technologies, Inc., Boulder, Colo.

[21] Appl. No.: 203,182

[22] Filed: Feb. 28, 1994

[51] Int. Cl.⁶ .......................................... H04M 15/00
[52] U.S. Cl. .................................. 379/114; 379/115; 379/128; 379/131
[58] Field of Search ............... 379/113, 114, 131, 140, 379/112

[56] References Cited

U.S. PATENT DOCUMENTS

| | | | |
|---|---|---|---|
| 4,585,904 | 4/1986 | Mimron et al. | 379/131 |
| 4,751,728 | 6/1988 | Treat | 379/113 |
| 4,924,510 | 5/1990 | Le | 379/221 |
| 5,027,388 | 6/1991 | Bradshaw et al. | 379/112 |
| 5,095,505 | 3/1992 | Finucane et al. | 379/201 |
| 5,177,604 | 1/1993 | Martinez | 358/86 |
| 5,208,848 | 5/1993 | Pula | 379/67 |
| 5,237,604 | 8/1993 | Ryan | 379/220 |
| 5,241,588 | 8/1993 | Babson, III et al. | 379/201 |

Primary Examiner—Stephen Chin
Assistant Examiner—Kevin Kim
Attorney, Agent, or Firm—Brooks and Kushman

[57] ABSTRACT

A method and system for real time selection of an interexchange telephone carrier for a telephone call. The system includes a processing, storage and routing equipment capable of performing the method steps of generating a call information signal, storing a carrier rate for each of the plurality of carriers, each carrier rate including a toll, calling day and calling time, processing the call information signal and the carrier rates to select the carrier having the least expensive toll for the day and time the call is placed, and routing the call through the carrier selected.

2 Claims, 4 Drawing Sheets

SYSTEM AND METHOD FOR REAL TIME CARRIER SELECTION

TECHNICAL FIELD

This invention relates generally to Advanced Intelligent Network (AIN) services and, more particularly, to an automated system and method for real time selection of a telephone carrier for a telephone call.

BACKGROUND ART

Advanced Intelligent Network (AIN) subscribers may currently select inter-exchange carriers (IECs) for inter-exchange telephone calls in one of two fashions. First, a subscriber may designate a default IEC through which all of the subscriber's telephone calls are automatically routed. Obviously, however, this type of IEC selection is insufficient when, for any number of potential reasons, most commonly current IEC rates, the subscriber wishes to have one or more of its telephone calls routed through a particular IEC other than the designated default IEC.

As a result, an AIN subscriber may also manually select an IEC through which the subscriber's telephone calls are routed. Such manual selection of an IEC allows the subscriber to choose, for example, the IEC having the least expensive toll at the time the subscriber places a telephone call. However, while allowing greater freedom of choice, manual IEC selection still presents a variety of problems for the subscriber.

First, to choose an IEC other than the designated default IEC, the subscriber must employ manual selection each and every time a telephone call is placed. Moreover, to maximize the effectiveness of manual IEC selection, the subscriber must either be knowledgeable regarding various IEC parameters, or have ready access to such information. That is, in the example cited above, to effectively select the IEC having the least expensive rate, the subscriber must know all of the available IECs, as well as their various rates. To complicate matters, IEC rates may vary not only from day to day, but from hour to hour as well.

Finally, by its very nature, manual selection of an IEC is made before the subscriber places a telephone call. In that sense, manual selection of an IEC is not a "real time" selection, where an IEC is automatically chosen at the same time the subscriber places a telephone call. Thus, even where the subscriber is knowledgeable regarding the available IECs, manual IEC selection can be time consuming and inefficient. Indeed, in the example cited above regarding rates, by having to manually select an IEC each time a telephone call is placed, the subscriber may sacrifice in productivity the very savings realized by reduced rates.

Various systems and methods exist for routing telephone calls in general. For example, U.S. Pat. No. 5,237,604 issued to Ryan discloses a system and method for serving a telephone caller from two switching systems. The system and method are designed for customers that change from an analog to a digital switching system, but wish to maintain their original telephone number which is associated with an analog switching system. The system and method thus establish connections over a telephone network to a customer whose telephone number is associated with a first switching system, but is actually served by a second switching system.

U.S. Pat. No. 5,208,848 issued to Pula discloses a system and method for telecommunication call processing. The system and method utilize an intelligent peripheral device to recognize service request information provided by a customer, via dialing or speech. If necessary, the peripheral device is capable of supplying digits or characters to a switch such that the customer service request is properly executed.

Neither of these systems and methods, however, are adapted to select one of a plurality of IECs through which a telephone call will be routed. More specifically, neither of these systems and methods are adapted for real time selection of the IEC having the least expensive toll at the time the telephone call is placed. Moreover, no such systems or methods as just described are known, particularly for use in conjunction with AIN.

DISCLOSURE OF INVENTION

Accordingly, it is the principle object of the present invention to provide an improved system and method for real time selection of a telephone carrier for a telephone call.

Another object of the present invention is to provide a system and method for real time selection of a telephone carrier for a telephone call that automatically selects the carrier having the least expensive toll at the time the call is placed.

According to the present invention, then, a system and method for real time selection of a telephone carrier for a telephone call is provided. The system of the present invention comprises means for generating a call information signal representing selected parameters of the call, and means for storing a carrier rate for each of the plurality of carriers, each carrier rate comprising a toll, calling day and calling time. The system further comprises means for processing the call information signal and the carrier rates to select the carrier having the least expensive toll for the day and time the call is placed, and means for routing the call through the carrier selected.

The method of the present invention for real time selection of an inter-exchange telephone carrier for a telephone call comprises generating a call information signal representing selected parameters of the call, and providing storage means for storing a carrier rate for each of the plurality of carriers, each carrier rate comprising a toll, calling day and calling time. The method further comprises processing the call information signal and the carrier rates to select the carrier having the least expensive toll for the day and time the call is placed, and routing the call through the carrier selected.

These and other objects, features and advantages of the present invention will be readily apparent from the following detailed description of the best mode for carrying out the invention when taken in connection with the accompanying drawings.

BEST MODE FOR CARRYING OUT THE INVENTION

Figure 1:
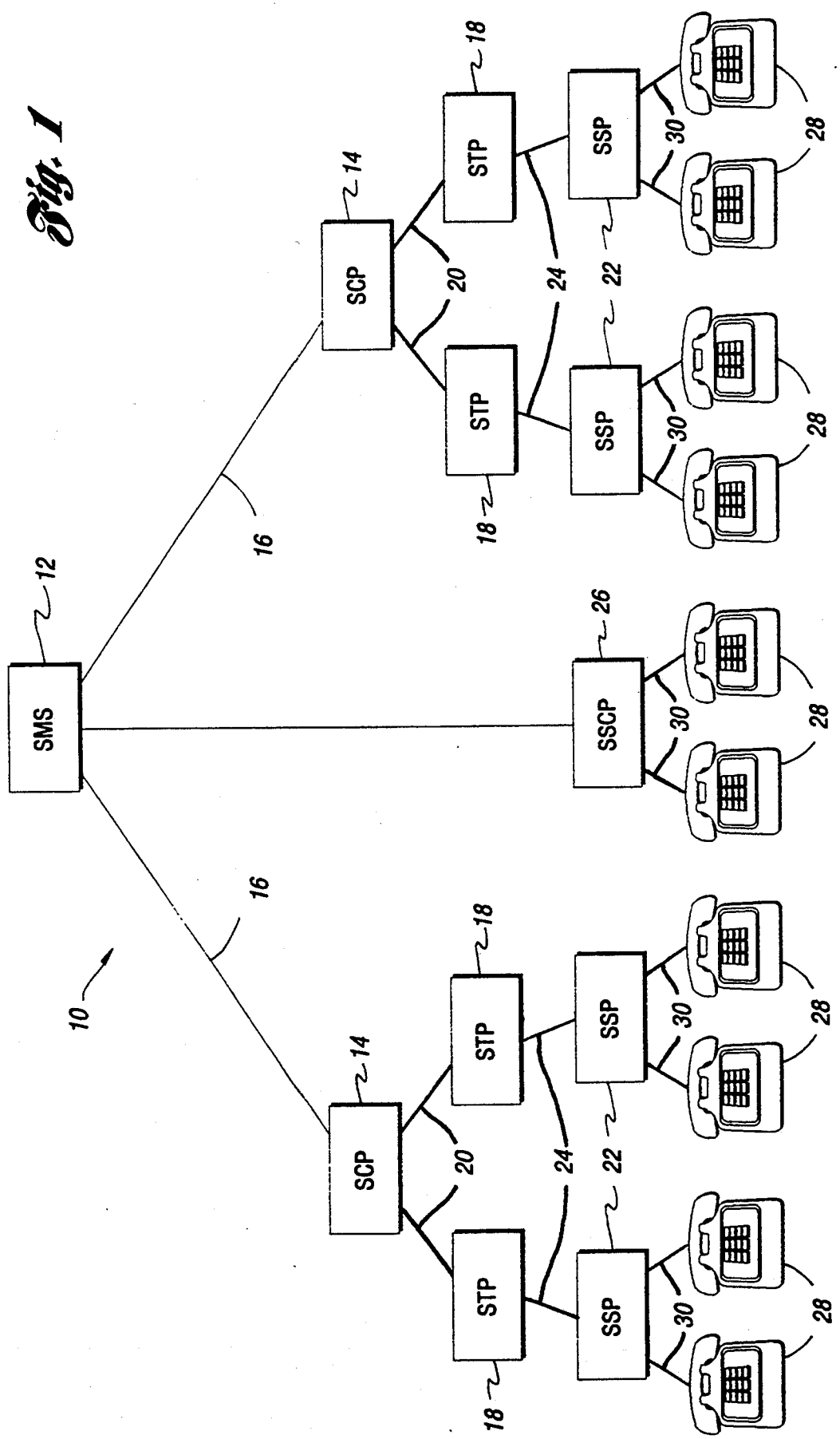
FIG. 1 is a representative diagram of an Advanced Intelligent Network (AIN)

With reference to FIG. 1, a representative diagram of Advanced Intelligent Network (AIN) architecture is shown for use in a Public Switched Telephone Network (PSTN). The AIN architecture referred to is designated generally by reference numeral 10. As those skilled in the art will recognize, the AIN architecture (10) is comprised of various packet switching elements and transmission lengths, some of which are depicted in FIG. 1.

As seen therein, a Service Management System (SMS) (12) is provided which generally comprises a computer-based system used to design service logic, to control logic implementation to the network, and to manage the network operation, such as monitoring traffic levels and collecting statistics and billing data. The SMS (12) is provided in communication with a plurality of Service Control Points (SCP) (14) via management links (16). As those skilled in the art will recognize, SCPs (14) are nodes which contain the service logic and associated data support to execute the required customer services.

Still referring to FIG. 1, Signal Transfer Points (STP) (18) are provided in communication with SCPs (14) via signal links (20). STPs (18) are packet switches used to route signaling messages within the network. Still further, Service Switching Points (SSP) (22) are provided in communication with STPs (18) via signal links (24). Again, as those skilled in the art will recognize, SSPs (22) are generally nodes that recognize the "triggers" used when a subscriber invokes an intelligent network service and then communicate with the SCPs (14) to operate that service. In limited traffic situations, Service Switching and Control Points (SSCP) (26) are also provided for combining the functions of the SCPs (14) and SSPs (22). Finally, subscribers (28) communicate with SSPs (22) via lines (30).

Figure 2:
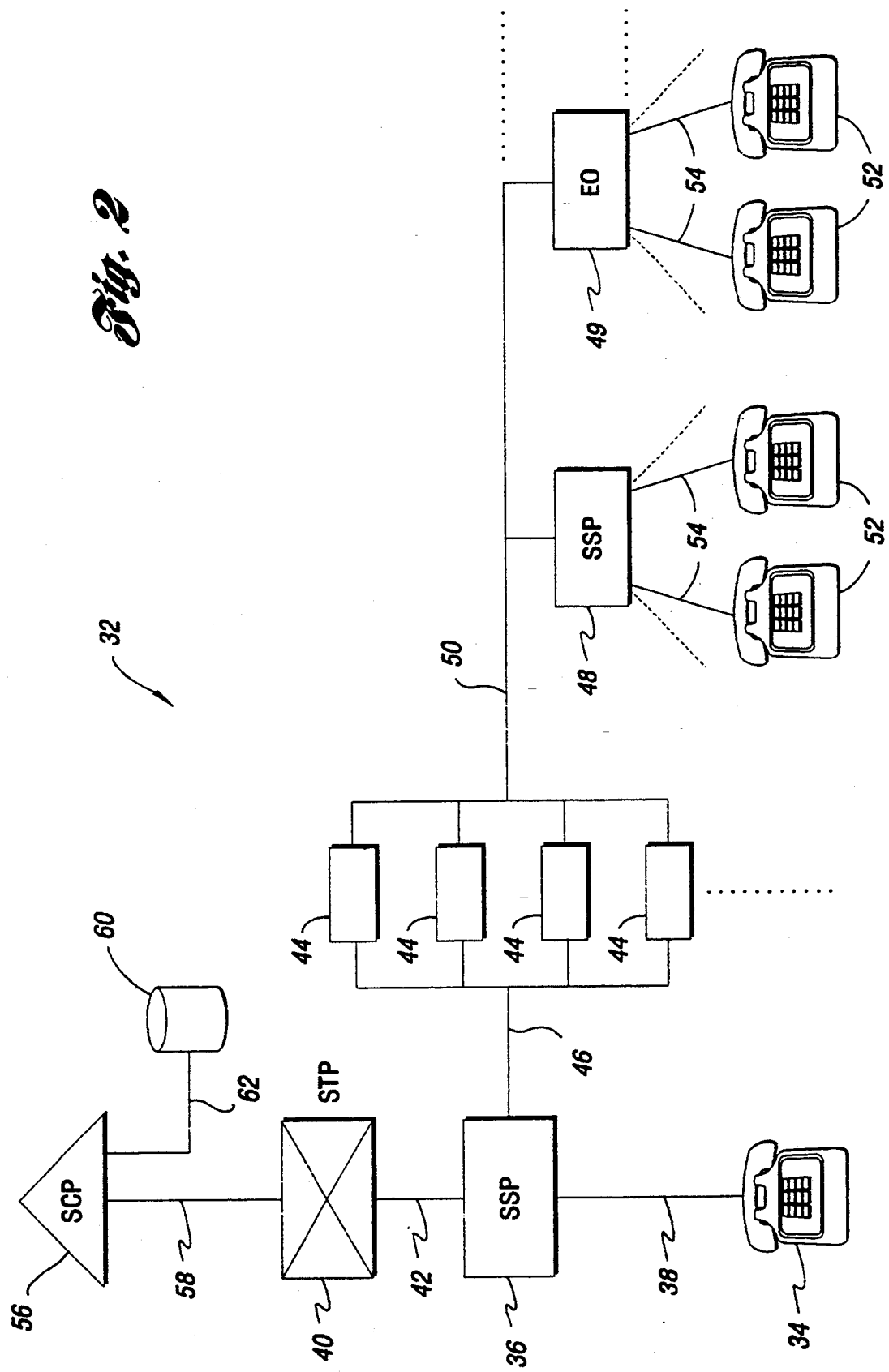
FIG. 2 is a block diagram of the system of the present invention.

Turning now to FIG. 2, a block diagram of the system of the present invention for real time selection of one of a plurality of inter-exchange telephone carriers for a telephone call is shown, designated generally by reference numeral 32. The system (32) is provided for use in a Public Switched Telephone Network (PSTN) provisioned for use with the AIN architecture (10) described in connection with FIG. 1.

Accordingly, at least one subscriber telephone, designated herein as a calling party telephone (34), is provided in communication with SSP (36), commonly referred to as a central office switch, via line (38). SSP (36) is further provided in communication with STP (40) via signal link (42), and a plurality of inter-exchange carriers (IEC) (44) via trunks (46). IECs (44) are also provided in communication with a plurality of other SSPs (48) and End Offices (EO) (49) via trunks (50).

In turn, SSPs (48) and EOs (49) are each provided in communication with a plurality of other subscriber telephones, herein designated as receiving party telephones (52), via lines (54). As will be described in greater detail below, when a call is placed by a subscriber on a calling party telephone (34), it is routed to one of the receiving party telephones (52) through the IEC (44) having the least expensive toll at the time the call is placed by the calling subscriber.

Still referring to FIG. 2, STP (40) is further provided in communication with SCP (56) via signal link (58). SCP (56) is itself provided in communication with database (60) via signal link (62). Database (60) comprises means for storing a carrier rate for each of a plurality of IECs (44), each carrier rate comprising a toll, calling day and calling time. Alternatively, database (60) may be integrated as part of SCP (56).

Similarly, SSP (36) comprises means for generating a call information signal representing selected parameters of the call. Likewise, SCP (56), calling party telephone (34), SSP (36), IEC (44), SSP (48) (or EO (49)), receiving party telephone (52), lines (38, 54) and trunks (46, 50) together comprise means for routing the call through the IEC (44) ultimately selected.

Finally, SCP (56) comprises means for processing the call information signal and the carrier rates to select the IEC (44) having the least expensive toll for the day and the time the call is placed. In that regard, and as will described in greater detail below with respect to the method of the present invention, SCP (56) further comprises means for determining the destination Local Area Telephone Access (LATA) of the call from the call information signal, means for comparing the destination LATA to a pre-determined LATA, and means for selecting a default carrier if the destination LATA and the pre-determined LATA match.

SCP (56) also comprises in that regard means for determining the day and time of the call from the call information signal, means for comparing the calling day and calling time of each carrier rate to the day and time of the call, and means for selecting each carrier rate whose calling day and calling time match the day and time of call. Finally, SCP (56) still further comprises in that regard means for setting a minimum toll to a predetermined value, means for comparing the minimum toll to the toll of one of the plurality of carrier rates, means for setting the minimum toll to the toll of the carrier rate when the minimum toll exceeds the toll of the carrier rate, and means for selecting the IEC whose toll equals the minimum rate.

Figure 3:
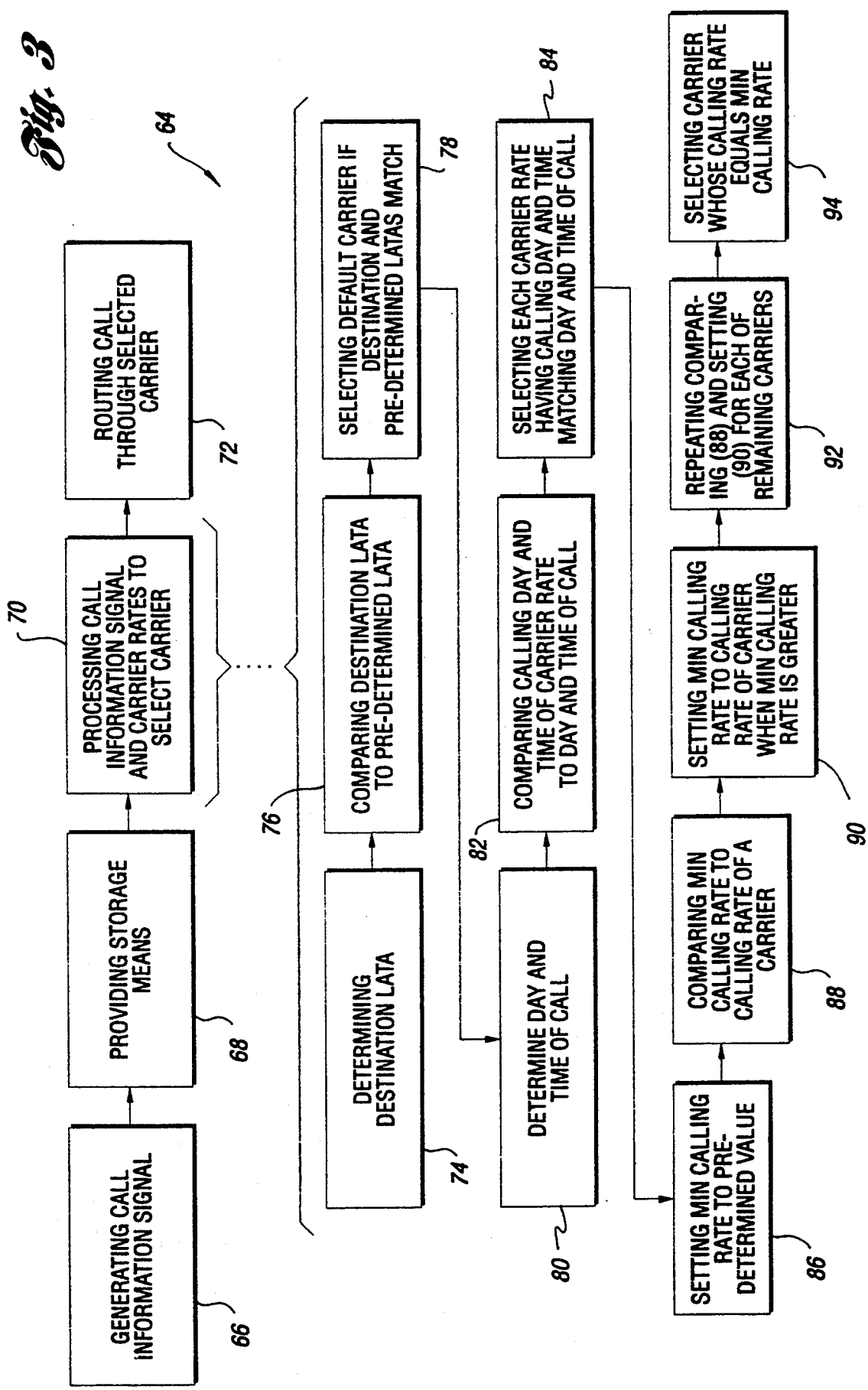
FIG. 3 is a block diagram of the method of the present invention.

With reference now to FIG. 3, a block diagram of the method of the present invention for real time selection of one of a plurality of IECs for a telephone call is shown, designated generally by reference numeral 64. The AIN architecture described above in connection with the system (32) of the present invention is utilized to execute the method (64) of the present invention. Accordingly, the following description of the method (64) of the present invention also refers to such AIN architecture.

As seen in FIG. 3, the method comprises generating (66) a call information signal representing selected parameters of the call, and providing (68) storage means for storing a carrier rate for each of the plurality of carriers. As previously stated, each carrier rate comprises a toll, calling day and calling time for one of the carriers. The method further comprises processing (70) the call information signal and the carrier rates to select the carrier having the least expensive toll for the day and time the call is placed, and routing (72) the call through the carrier selected.

Processing (70) the call and the carrier rates to select the carrier having the least expensive toll itself comprises determining (74) the destination Local Area Telephone Access (LATA) of the call from the call information signal, comparing (76) the destination LATA to a pre-determined LATA, and selecting (78) a default carrier if the destination LATA and the pre-determined LATA match.

In the preferred embodiment, the pre-determined LATA is preferably the origination LATA of the calling subscriber. If the destination LATA, which is determined from call information signal according to the NPA-NXX of the telephone number dialed by the calling subscriber, matches the origination LATA, then the method (64) of the present invention selects a default carrier through which the call is subsequently routed.

Still referring to FIG. 3, processing (70) the call information signal and the carrier rates to select the carrier having the least expensive toll also comprises determining (80) the day and time of the call from the call information signal, comparing (82) the calling day and calling time of each carrier rate to the day and time of the call, and selecting (84) each carrier rate whose calling day and calling time match the day and time of call.

Finally, processing (70) the call information signal and the carrier rates to select the carrier having the least expensive toll further comprises setting (86) a minimum toll to a predetermined value, comparing (88) the minimum toll to the toll of one of the plurality of carrier rates, and setting (90) the minimum toll to the toll of the carrier rate when the minimum toll exceeds the toll of the carrier rate. Processing (70) the call information signal and the carrier rates to select the carrier having the least expensive toll still further comprises repeating (92) the steps of comparing (88) and setting (90) just described for each remaining one of the plurality of carrier rates, and selecting (94) the carrier whose toll equals the minimum rate.

Figure 4:
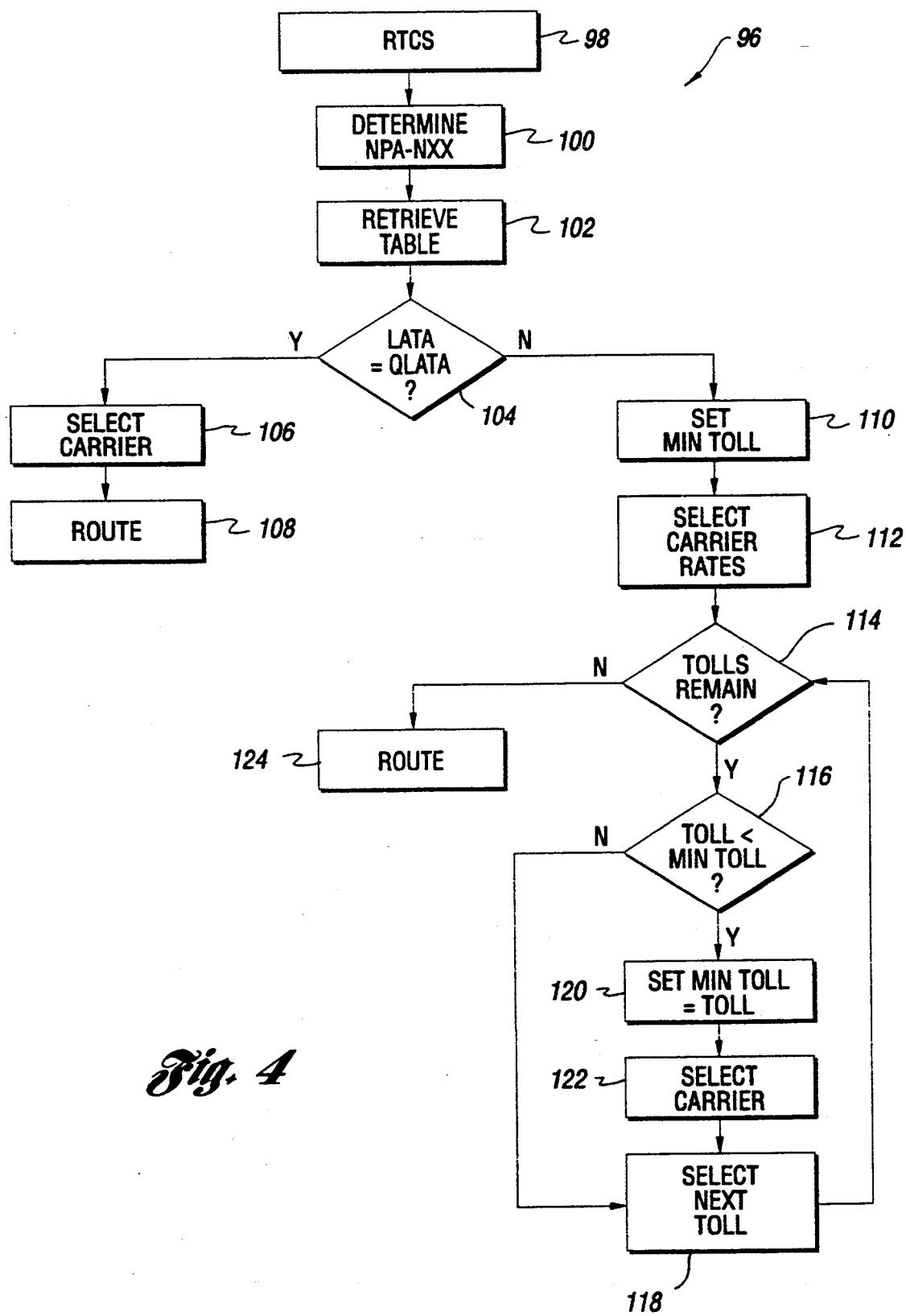
FIG. 4 is a logic flow chart for the system and method of the present invention.

Referring finally to FIG. 4, a logic flow chart for the system (32) and method (64) of the present invention is shown, designated generally by reference numeral 96. As seen therein, logic flow begins at Real Time Carrier Selection (RTCS) block (98). Logic flow proceeds to action block (100) wherein the NPA-NXX of the telephone number dialed by the calling subscriber is determined. Thereafter, at action block (102), a table containing a plurality of carrier rates for each of a plurality of carriers is retrieved from storage. As previously stated, each carrier rate comprises a toll, calling day and calling time for one of the carriers.

Logic flow then proceeds to decision block (104) wherein the LATA of the telephone number dialed by the calling subscriber (determined from call information signal according to the NPA-NXX of the telephone number dialed) is compared to a pre-determined LATA, shown as QLATA. If the dialed LATA matches the pre-determined LATA, a default carrier is selected at action block (106). The call is thereafter routed through the default carrier at action block (108).

However, if the dialed LATA does not match the pre-determined LATA, logic flow proceeds to action block (110) wherein a minimum toll is set to a pre-determined value. The pre-determined value is merely a starting point for comparison purposes and therefore may be any value that exceeds that of each of the tolls of the carrier rates.

Thereafter, logic flow proceeds to action block (112) wherein each carrier rate is selected whose calling day and calling time match the day and time of the subscriber's call. Subsequently, at decision block (114), it is determined if any of the carrier rates selected have a toll that has not yet been compared to the minimum toll.

If so, the toll of one of those carrier rates is compared to the minimum toll at decision block (116). If the minimum toll does not exceed the toll, then logic flow proceeds to action block (118) wherein the next toll is selected. As previously stated, the pre-determined value selected for initialization of the minimum toll is chosen such that it exceeds all of the tolls associated with each of the carrier rates.

If, however, the minimum toll does exceed the toll, then logic flow proceeds to action block (120) wherein the minimum toll is set to the value of the toll. Immediately thereafter, at action block (122), the carrier associated with that toll is selected and logic flow proceeds to action block (118) wherein the next toll is selected.

From action block (118), logic flow proceeds back to decision block (114), where it is again determined if any of the carrier rates selected have a toll that has not yet been compared to the minimum toll. If not, logic flow finally proceeds to action block (124) wherein the subscribers call is routed through the last carrier selected which, according to the logic flow described above, is the carrier having the least expensive toll for the day and time of the subscriber's call.

As is readily apparent from the foregoing description, the present invention provides an improved system (32) and method (64) for real time selection of a telephone carrier for a telephone call that automatically selects the carrier having the least expensive toll at the time the call is placed. Indeed, the system (32) and method (64) of the present invention are truly automated and provide for real time carrier selection in that no prompting information of any kind is required from the calling subscriber in order to properly route the subscriber's call.

The system (32) and method (64) for real time carrier selection of the present invention have been described and shown herein in conjunction selection of an interexchange carrier based on carrier rate parameters. However, it should be readily apparent that the system (32) and method (64) of the present invention are suitable for use in any application wherein selection of any type of carrier based on any type of parameters may be required.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

I claim:

1. An automated method for real time selection of one of a plurality of telephone carriers for a telephone call, the method comprising:

generating a call information signal representing selected parameters of the call;

providing storage means for storing a carrier rate for each of the plurality of carriers, each carrier rate comprising a toll, calling day and calling time;

processing the call information signal and the carrier rates to select a carrier having the least expensive toll for the day and time the call is placed, processing the call information signal and the carrier rates including:

determining the destination local area telephone access (LATA) of the call from the call information signal;

comparing the destination LATA to a predetermined LATA;

selecting a default carrier of the destination LATA and the predetermined LATA match; and determining the day and time of the call from the call information signal;

comparing the calling day and calling time of each carrier rate to the day and time of the call;

selecting each carrier rate whose calling day and calling time match the day and time of the call;

setting a minimum toll to a predetermined value;

comparing the minimum toll to the toll of one of the plurality of carrier rates;

setting the minimum toll to the toll of the carrier rate when the minimum toll exceeds the toll of the carrier rate;

repeating the comparing and setting the minimum toll to the carrier rate toll steps for each remaining one of the plurality of carrier rates;

selecting the carrier whose toll equals the minimum rate;

routing the call through the carrier selected;

wherein generating, providing, processing and routing are performed via components of an advanced intelligent network.

2. An automated system for real time selection of one of a plurality of telephone carriers for a telephone call, the system comprising:

means for generating a call information signal representing selected parameters of the call;

means for providing storage means for storing a carrier rate for each of the plurality of carriers, each carrier rate comprising a toll, calling day and calling time;

means for processing the call information signal and the carrier rates to select a carrier having the least expensive toll for the day and time the call is placed, the means for processing the call information signal and the carrier rates including:

means for determining the destination local area telephone access (LATA) of the call from the call information signal;

means for comparing the destination LATA to a predetermined LATA;

means or selecting a default carrier if the destination LATA and the predetermined LATA match; and means for determining the day and time of the call from the call information signal;

means for comparing the calling day and calling time of each carrier rate to the day and time of the call;

means for selecting each carrier rate whose calling day and calling time match the day and time of the call;

means for setting a minimum toll to a predetermined value;

means for comparing the minimum toll to the toll of one of the plurality of carrier rates;

means for setting the minimum toll to the toll of the carrier rate when the minimum toll exceeds the toll of the carrier rate;

means for repeating the comparing and setting the minimum toll to the carrier rate toll steps for each remaining one of the plurality of carrier rates;

means for selecting the carrier whose toll equals the minimum rate;

means for routing the call through the carrier selected;

wherein the means for generating, means for providing, means for processing and means for routing include components of an advanced intelligent network.

* * * * *